US012665200B2

(12) United States Patent
Zhang et al.

(10) Patent No.: US 12,665,200 B2
(45) Date of Patent: Jun. 23, 2026

(54) ELECTRODE PLATE, MANUFACTURING METHOD, RECHARGEABLE BATTERY AND PRODUCTION DEVICE

(71) Applicant: JIANGSU ADVANCED MATERIAL TECH CO., LTD., Liyang (CN)

(72) Inventors: Lei Zhang, Liyang (CN); Xiaoming Wang, Liyang (CN); Qiang Xu, Liyang (CN); Haotian Yang, Liyang (CN); Jinku Xie, Liyang (CN); Fengjie Wei, Liyang (CN); Yukun Zhou, Liyang (CN)

(73) Assignee: JIANGSU ADVANCED MATERIAL TECH CO., LTD., Liyang (CN)

( * ) Notice: Subject to any disclaimer, the term of this patent is extended or adjusted under 35 U.S.C. 154(b) by 602 days.

(21) Appl. No.: 18/248,696

(22) PCT Filed: May 10, 2021

(86) PCT No.: PCT/CN2021/092597
§ 371 (c)(1),
(2) Date: Apr. 12, 2023

(87) PCT Pub. No.: WO2022/095392
PCT Pub. Date: May 12, 2022

(65) Prior Publication Data
US 2023/0378478 A1 Nov. 23, 2023

(30) Foreign Application Priority Data
Nov. 5, 2020 (CN) .......................... 202011221856.3

(51) Int. Cl.
H01M 50/536 (2021.01)
H01M 4/04 (2006.01)
(Continued)

(52) U.S. Cl.
CPC ......... H01M 4/667 (2013.01); H01M 4/0404 (2013.01); H01M 4/70 (2013.01);
(Continued)

(58) Field of Classification Search
CPC ...... H01M 4/667; H01M 4/0404; H01M 4/70; H01M 50/536; H01M 10/0404; H01M 10/0525
See application file for complete search history.

(56) References Cited

U.S. PATENT DOCUMENTS

2005/0277021 A1 12/2005 Kozuki et al.
2013/0177787 A1 7/2013 Arima et al.
(Continued)

FOREIGN PATENT DOCUMENTS

CN 1716659 A 1/2006
CN 101345322 * 1/2009
(Continued)

OTHER PUBLICATIONS

International Search Report issued in PCT International Application No. PCT/CN2021/092597, ISA/CN China National Intellectual Property Administration, Beijing, China, with English translation, 4 pages.
(Continued)

*Primary Examiner* — Jayne L Mershon
(74) *Attorney, Agent, or Firm* — Barnes & Thornburg, LLP; Tina M. Dorr

(57) ABSTRACT

An electrode plate includes a current collector which includes an insulating layer, a first conductor layer and a second conductor layer disposed on two sides of the insulating layer respectively, and a conductive connector. The outward side of the first conductor layer is provided with a first blank region and a first active material coating layer. The outward side of the second conductor layer is provided
(Continued)

with a second blank region and a second active material coating layer. The first blank region is provided with a folded region, and the second blank region covers the first blank region. One end of the conductive connector extends out of the folded region to connect the first blank region. The other end of the conductive connector is connected to the second blank region. The conductive connector is adapted to electrically connect the first blank region and the second blank region.

14 Claims, 3 Drawing Sheets

(51) Int. Cl.
| | | |
|---|---|---|
| *H01M 4/66* | (2006.01) | |
| *H01M 4/70* | (2006.01) | |
| *H01M 10/04* | (2006.01) | |
| *H01M 10/0525* | (2010.01) | |

(52) U.S. Cl.
CPC ... *H01M 10/0404* (2013.01); *H01M 10/0525* (2013.01); *H01M 50/536* (2021.01)

(56) References Cited

U.S. PATENT DOCUMENTS

| | | | | |
|---|---|---|---|---|
| 2020/0144676 | A1 | 5/2020 | Tsuruta et al. | |
| 2020/0313197 | A1* | 10/2020 | Wei ................... | H01M 10/0525 |
| 2022/0352540 | A1 | 11/2022 | Chen et al. | |
| 2023/0299436 | A1* | 9/2023 | Tanaka ............... | H01M 50/533 |
| | | | | 429/94 |

FOREIGN PATENT DOCUMENTS

| | | | |
|---|---|---|---|
| CN | 101345322 | A | 1/2009 |
| CN | 101916841 | B | 1/2013 |
| CN | 102856558 | A | 1/2013 |
| CN | 205543117 | U | 8/2016 |
| CN | 110611116 | A | 12/2019 |
| CN | 210805919 | U | 6/2020 |
| CN | 112289970 | A | 1/2021 |
| CN | 214068752 | U | 8/2021 |
| JP | 2013062385 | A | 4/2013 |
| WO | 2012102220 | A1 | 8/2012 |
| WO | 2017219345 | A1 | 12/2017 |

OTHER PUBLICATIONS

Chinese Office Action in Chinese Application No. 2020112218563 issued Oct. 29, 2024, 16 pages, State Intellectual Property Office, Haidian District, Beijing CN.

Search Report in Chinese Application No. 2020112218563 issued Oct. 24, 2024, 4 pages, State Intellectual Property Office, Tianjin Center, CN.

Office Action in Indian Application No. 202327027202, issued Jan. 6, 2026, 8 pages, Indian Patent Office, Delhi, India.

European Search Report in European Application No. 21888096.1, issued May 28, 2025, 5 pages, European Patent Office, Munich, Germany.

\* cited by examiner

ELECTRODE PLATE, MANUFACTURING METHOD, RECHARGEABLE BATTERY AND PRODUCTION DEVICE

CROSS-REFERENCES TO RELATED APPLICATIONS

This application is a national stage application filed under 35 U.S.C. 371 based on International Patent Application No. PCT/CN2021/092597, filed on May 10, 2021, which claims priority to Chinese Patent Application No. 202011221856.3 filed with the China National Intellectual Property Administration (CNIPA) on Nov. 5, 2020, the disclosures of which are incorporated herein by reference in their entireties.

BACKGROUND OF THE INVENTION

The present application relates to the field of rechargeable battery technology, for example, an electrode plate, a manufacturing method, a rechargeable battery, and a production device.

A rechargeable battery is also referred to as a storage battery and refers to a battery that can continue to be used by activating an active substance through charging after the battery is discharged.

The rechargeable battery utilizes the reversibility of a chemical reaction, that is, after the chemical reaction is converted into electrical energy, chemical system can recover by using the electrical energy and then convert the chemical reaction into the electrical energy, so it is called a rechargeable battery. The main rechargeable batteries in the market are nickel-hydrogen batteries, nickel-cadmium batteries, lead-acid (or lead storage) batteries, lithium-ion batteries, and polymer lithium-ion batteries.

A lithium-ion battery is formed by winding or superposing a basic unit structure consisting of a positive electrode/a separator/a negative electrode. A chemical reaction occurs between the positive electrode and the negative electrode, and a current is generated; the current is collected and exported by current collectors in the positive electrode and the negative electrode; and the separator is responsible for separating the positive electrode and the negative electrode, thereby avoiding a short circuit caused by contact between the positive electrode and negative electrode. When a battery is crushed and deformed on impact, the battery breaks, a conventional metal current collector easily pierces the separator and then causes a short circuit inside the battery and causes combustion and explosion. To improve the safety of a battery, a technician disposes a metal conductor layer on two sides of a polymer support to form a composite current collector. This composite current collector can reduce breakage and piercing probability. However, since the polymer in the middle of the composite current collector has a high resistance, conductor layers on two sides are insulated from each other, and thus it is difficult to export currents together.

In the related art, application No. CN102856558A discloses a current collector and a non-aqueous rechargeable battery. The current collector and the non-aqueous rechargeable battery have a folded region formed by folding more than twice the end of a multilayer structure in the same direction, and the multilayer structure is formed by clamping an insulating layer via conductive layers. In the folded region, the conductive layers clamping the insulating layer are electrically connected, so that the inner surfaces of the end portions of the current collector within the folded region are separated or partially contacted.

The preceding related technical solutions has the following defects: Firstly, in the manufacturing process of the current collector, it is necessary to cut a long strip-shaped current collector raw material into several individual current collector raw materials and then roll up the individual current collector raw materials by 360 degrees for welding. In this manner, since it is necessary to perform manufacturing on the strip-shaped current collector raw material after cutting, it is not conducive to streamlined continuous manufacturing; secondly, it is necessary to weld roll-up portions during processing, and however, since the roll-up portions are curled up, and then the roll-up portions cannot fit against a welded position well, causing welding is weak, and the welding effect is poor; and finally, since the thickness of a conductor layer is small, and the two thin layers of metal are welded, it is difficult to ensure the welding strength, and the reliability is poor.

BRIEF SUMMARY OF THE INVENTION

The following is a summary of the subject matter described in detail herein. This summary is not intended to limit the scope of the claims.

The present application provides an electrode plate. The electrode plate can improve the safety of a rechargeable battery using the electrode plate and facilitate automatic continuous production.

The present application provides an electrode plate. A current collector includes an insulating layer, a first conductor layer disposed on a first side of the insulating layer, a second conductor layer disposed on a second side of the insulating layer, a first blank region, a first active material coating layer, a second blank region, a second active material coating layer, a folded region, and a conductive connector.

The first blank region and the first active material coating layer are disposed on the side of the first conductor layer away from the insulating layer. The first blank region and the first active material coating layer are disposed side by side and adjacent to each other.

The second blank region and the second active material coating layer are disposed on the side of the second conductor layer away from the insulating layer. The second blank region and the second active material coating layer are disposed side by side and adjacent to each other.

The folded region is disposed in the first blank region. When the current collector is folded, the second blank region partially covers the first blank region.

Part of the conductive connector overlaps the folded region. A first end of the conductive connector extends out of the folded region to connect the first blank region. A second end of the conductive connector is located in the folded region to connect the second blank region. The conductive connector is configured to be electrically connected to the first blank region and the second blank region.

In another aspect, the present application also provides a manufacturing method of an electrode plate. The electrode plate includes a current collector, a first blank region, a second blank region, a folded region, and a conductive connection. The current collector includes a first conductor layer and a second conductor layer. The method includes the steps below.

An active material is disposed on a partial region of the first conductor layer to form the first active material coating layer and the first blank region. The first active material coating layer and the first blank region are disposed side by side and adjacent to each other. The active material is disposed on a partial region of the second conductor layer to form the second active material coating layer and the second blank region. The second active material coating layer and the second blank region are disposed side by side and adjacent to each other.

Part of the first blank region of the current collector is folded so that the folded region of the current collector is formed in the first blank region.

The first end of the conductive connector is connected to the first blank region. The second end of the conductive connector is connected to the folded second blank region.

In a third aspect, the present application also provides a rechargeable battery using the electrode plate. The rechargeable battery includes a positive electrode plate, a separator, and a negative electrode plate which are bonded in sequence, and also includes an electrolyte.

At least one of the positive electrode plate or the negative electrode plate uses the preceding electrode plate.

In a fourth aspect, the present application also provides a production device for producing an electrode plate. The device is configured to produce the preceding electrode plate. The electrode plate includes the conductive connector. The device includes a discharge roller, a forming mechanism, a folding mechanism, an attachment conductive connector mechanism, an ultrasonic welding apparatus, and a take-up roller.

The discharge roller is configured to place a roll-shaped electrode plate.

A feeding mechanism is disposed between the discharge roller and the take-up roller. The feeding mechanism is configured to convert the roll-shaped electrode plate into a strip-shaped electrode plate and feed the strip-shaped electrode plate to the take-up roller.

The forming mechanism is configured to form a foldable cut in the strip-shaped electrode plate.

The folding mechanism is configured to fold the strip-shaped electrode plate at the cut.

The attachment conductive connector mechanism is configured to attach the conductive connector to the strip-shaped electrode plate.

The ultrasonic welding apparatus is configured to ultrasonically weld the conductive connector to the strip-shaped electrode plate.

Other aspects can be understood after the drawings and the detailed description are read and understood.

BRIEF DESCRIPTION OF DRAWINGS

The drawings used in description of the example embodiments or the related art are briefly described below. The drawings described below illustrate part of embodiments of the present application, and those of ordinary skill in the art may obtain other drawings based on these drawings on the premise that no creative work is done.

Figure 1:
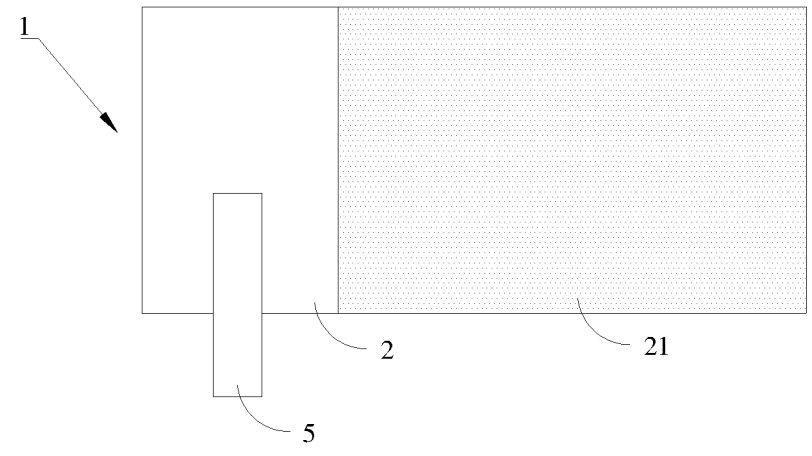
FIG. 1 is a diagram illustrating the structure of an electrode plate according to the present application.

REFERENCE LIST 1 current collector
11 insulating layer
12 first conductor layer
13 second conductor layer
2 first blank region
21 first active material coating layer
3 second blank region
31 second active material coating layer
4 folded region
5 conductive connector
6 positive electrode plate
7 separator
8 negative electrode plate
9 discharge roller
91 take-up roller
92 feeding mechanism
10 forming mechanism
101 folding mechanism
102 attachment conductive connector
103 ultrasonic welding apparatus

DETAILED DESCRIPTION OF THE INVENTION

Technical solutions of the present application are described clearly and completely in conjunction with drawings. Apparently, the embodiments described are part, not all, of the embodiments of the present application. Based on the embodiments of the present application, all other embodiments obtained by those of ordinary skill in the art without creative work are within the scope of the present application.

Embodiment One

Figure 2:
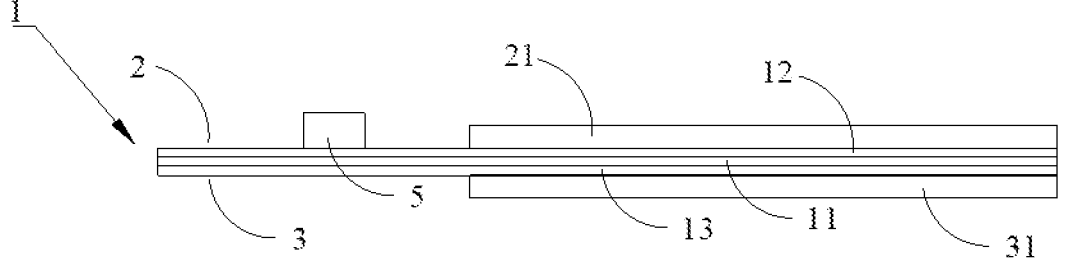
FIG. 2 is a side view of an electrode plate according to the present application.

As shown in FIGS. 1 and 2, an electrode plate includes a current collector 1. The current collector 1 includes an insulating layer 11, and a first conductor layer 12 and a second conductor layer 13 disposed on two sides of the insulating layer 11 respectively. The first conductor layer 12 is connected to the second conductor layer 13 so that the current on the current collector 1 is leaded out. A first blank region 2 and a first active material coating layer 21 are disposed on the side of the first conductor layer 12 away from the insulating layer. The first blank region 2 and the first active material coating layer 21 are disposed side by side and adjacent to each other. A second blank region 3 and a second active material coating layer 31 are disposed on the side of the second conductor layer 13 away from the insulating layer. The second blank region 3 and the second active material coating layer 31 are disposed side by side and adjacent to each other. The insulating layer 11 is made of one or more constituent materials of polyester, polyethylene, polypropylene, and polyarylsulfone. In this embodiment, the insulating layer 11 may be made of, but is not limited to, polyester. Each of the first active material coating layer 21 and the second active material coating layer 31 is coated with an active material.

To electrically connect the first blank region 2 and the second blank region 3, in the first blank region 2, the current collector 1 is folded by 180 degrees to form a folded region 4. At the same time, the second blank region 3 at the folded region 4 covers the first blank region 2. A conductive connector 5 is disposed in the folded region 4. An end of the conductive connector 5 extends out of the folded region 4 to connect the first blank region 2, and the other end is located in the folded region 4 to connect the second blank region 3, so that a current is exported or imported from the current collector 1. In this embodiment, the conductive connector 5 may use, but is not limited to, a tab. The connection mode between the conductive connector 5 and the first blank region 2 and the second blank region 3 may use, but is not limited to, ultrasonic welding.

Figure 3:
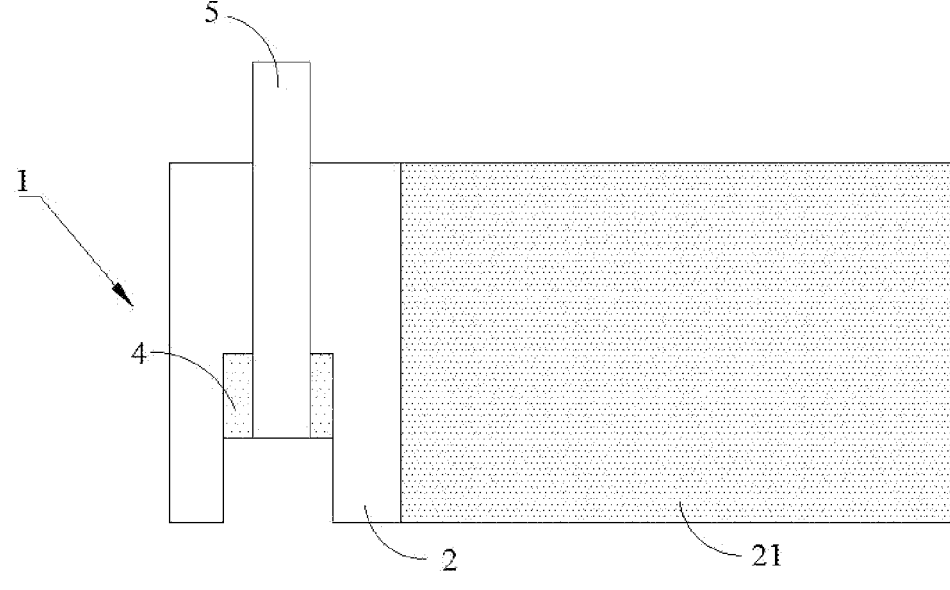
FIG. 3 is a diagram illustrating the structure of an electrode plate according to embodiment one of the present application.

In this embodiment, as shown in FIG. 3, the folding region 4 is strip-shaped, that is, two parallel tangents in the vertical direction are cut on the current collector 1, and then the strip-shaped cut portion is folded vertically.

Referring to the continuous strip-shaped current collector 1 of FIGS. 2 and 3, through the folded region 4, the current collector 1 does not need to be completely cut during production, but may be partially cut and then folded. In this manner, for the production process of a production line, continuous production is enabled. By the method for welding the conductive connector 5 to connect the first blank region 2 and the second blank region 3, the connection is more stable, and the connection stability is higher.

Embodiment Two

Figure 4:
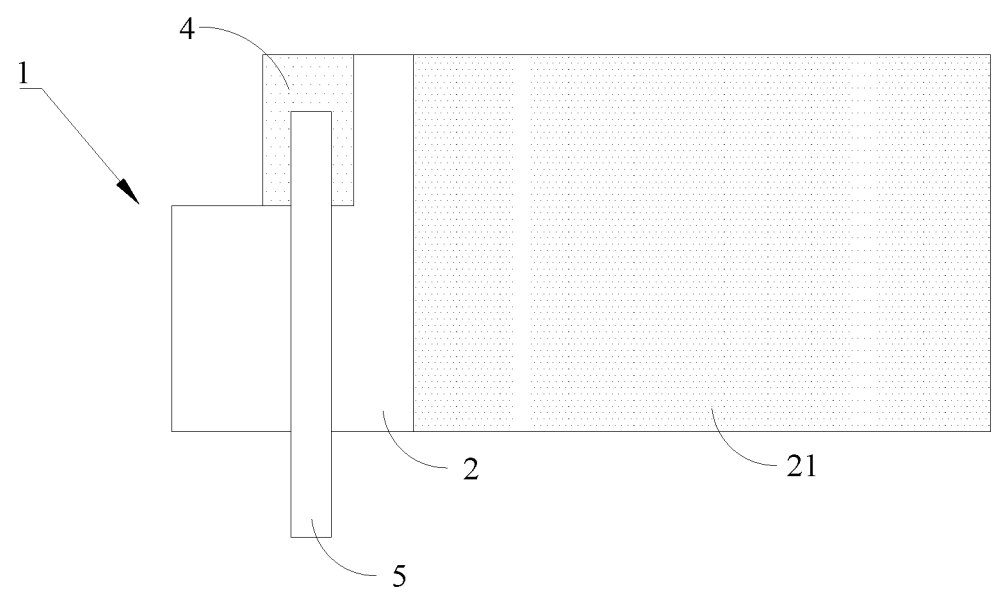
FIG. 4 is a diagram illustrating the structure of an electrode plate according to embodiment two of the present application.

As shown in FIG. 4, an electrode plate differs from embodiment one in that the cut strip is L-shaped, and the folding region 4 is folded transversely.

Embodiment Three

Figure 5:
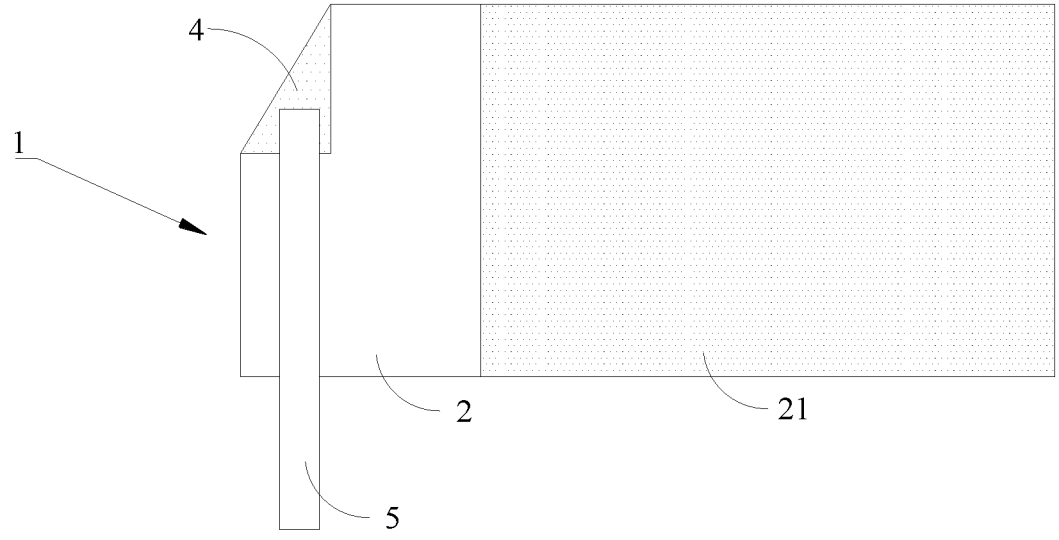
FIG. 5 is a diagram illustrating the structure of an electrode plate according to embodiment three of the present application.

As shown in FIG. 5, an electrode plate differs from embodiment one in that the cut strip is an oblique line in the vertical direction, and the folding region 4 is folded obliquely.

Embodiment Four

A manufacturing method of an electrode plate includes the steps below.

Step one: An active material is disposed on a partial region of the first conductor layer 12 of the current collector 1 to form the first active material coating layer 21 and the first blank region 2. The first blank region 2 and the first active material coating layer 21 are disposed side by side and adjacent to each other. An active material is disposed on a partial region of the second conductor layer 13 to form the second active material coating layer 31 and the second blank region 3. The second blank region 3 and the second active material coating layer 31 are disposed side by side and adjacent to each other.

Step two: Part of the first blank region 2 of the current collector 1 is folded so that the current collector 1 forms the folded region 4 in the first blank region 2.

Step three: An first end of the conductive connector 5 is connected to the first blank region 2. A second end of the conductive connector is connected to the folded second blank region 3.

To be able to implement the streamlined automatic production of a production device, the manufacturing method may be implemented in the steps below.

Figure 7:
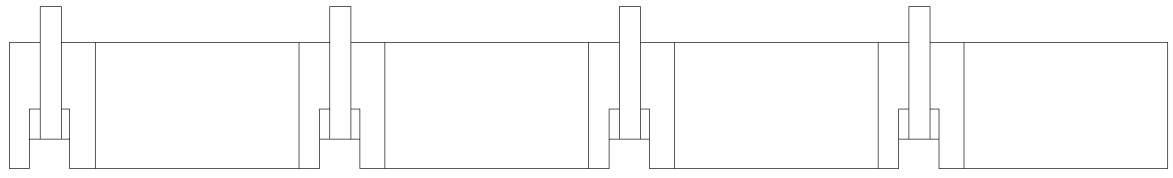
FIG. 7 is a diagram illustrating a continuous structure of electrode plates according to the present application.

In step one, active materials are disposed on first conductor layers on multiple current collectors at intervals to form multiple first active material coating layers 21. One first blank region 2 is formed between every two adjacent first active material coating layers 21. Active materials are disposed on second conductor layers on the multiple current collectors at intervals to form multiple second active material coating layers 31. One second blank region 3 is formed between every two adjacent second active material coating layers 31 (as shown in FIG. 7, FIG. 7 is a diagram illustrating a continuous structure of electrode plates according to the present application). One current collector 1, one first blank region 2, one first active material coating layer 21, one second blank region 3, one second active material coating layer 31 form a semi-finished current collector. Multiple semi-finished current collectors are connected end to end to form a continuous semi-finished current collector. The end-to-end strip-shaped continuous current collector 1 including several semi-finished active material coating layers and semi-finished blank regions is mass-produced.

In step two, the first blank region 2 of each semi-finished current collector in the continuous semi-finished current collector is partially cut. Each first blank region is folded by a folding apparatus so that each semi-finished current collector forms a folded region 4 in the first blank region 2.

In step three, the conductive connector 5 of each semi-finished current collector is placed in the folded region 4. A first end of the conductive connector 5 is welded to the first blank region 2. A second end of the conductive connector is welded to the folded second blank region 3. One semi-finished current collector and one conductive connector form one semi-finished electrode plate. Multiple semi-finished electrode plates are connected end to end to form a continuous semi-finished electrode plate.

Newly added step four: The continuous semi-finished electrode plate is cut into individual electrode plates. Alternatively, the continuous semi-finished electrode plate may be wound together with a separator 7 to form a dry cell and then be cut.

In step three, the folding apparatus uses a mechanical arm to turn over the first blank region. The folding apparatus is rotationally driven by a stepping motor. The stepping motor drives the mechanical arm to turn over 180 degrees, thereby folding the current collector 1 to form the folded region 4.

In the existing art, the current collector 1 needs to be cut down for curl welding. However, by the processing step of this embodiment, the entire long strip-shaped semi-finished product is automatically processed based on the automated production line in the related art. After the processing, the semi-finished product is cut into individual electrode plates according to use requirements.

Embodiment Five

Figure 6:
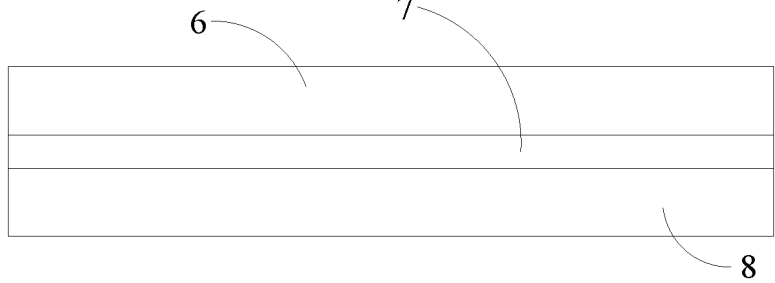
FIG. 6 is a diagram illustrating the structure of a rechargeable battery according to embodiment five of the present application.

As shown in FIG. 6, a rechargeable battery using the electrode plate includes a positive electrode plate 6, a separator 7, and a negative electrode plate 8 that are bonded in sequence, and the rechargeable battery also includes an electrolyte. At least one of the positive electrode plate 6 or the negative electrode plate 8 uses the electrode plate in embodiment one.

For example, when the electrode plate in embodiment one is used as the positive electrode plate 6, the material of the first conductor layer and the material of the second conductor layer each are aluminium or aluminium alloy. When the electrode plate in embodiment one is used as the negative electrode plate 8, the material of the first conductor layer and the material of the second conductor layer each are copper or copper alloy.

Embodiment Six

Figure 8:
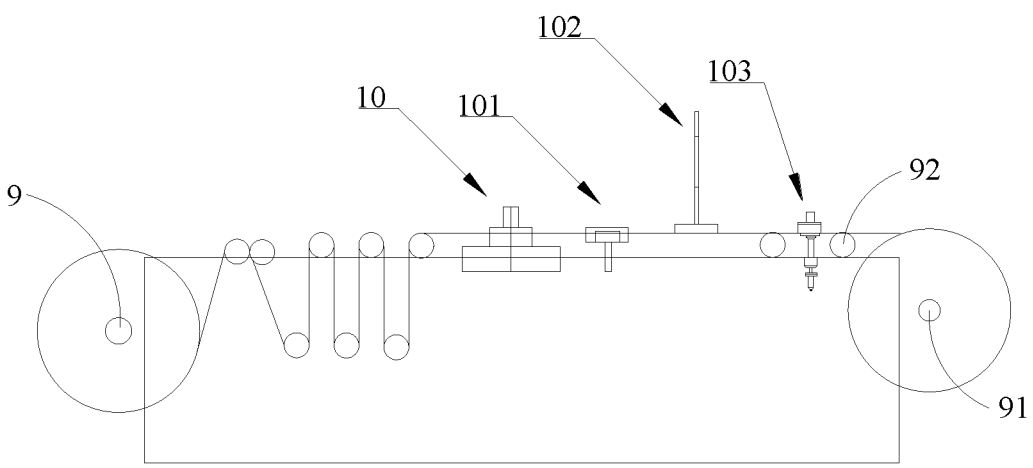
FIG. 8 is a diagram illustrating the structure of a production device according to the present application.

As shown in FIG. 8, a production device of the electrode plate produces the electrode plate in this embodiment of the present application. The electrode plate includes the conductive connector. The production device includes a discharge roller 9, a forming mechanism 10, a folding mechanism 101, an attachment conductive connector mechanism 102, an ultrasonic welding apparatus 103, and a take-up roller 91 placed in sequence. A user may place the roll-shaped electrode plate raw material on the discharge roller 9. A feeding mechanism 92 disposed between the discharge roller 9 and the take-up roller 91 discharges the roll-shaped electrode plate raw material, processes the raw material, and finally feeds the raw material to the take-up roller 91. The feeding mechanism 92 may use, but is not limited to, a belt driven by a drive motor for conveying.

In this embodiment, the forming mechanism 10 may use, but is not limited to, an automatic control cutting device for partially cutting the strip-shaped electrode plate raw material at intervals.

In this embodiment, the folding mechanism 101 may use, but is not limited to, a stepping motor to drive a mechanical arm to fold the electrode plate raw material at a cut position. The attachment conductive connector mechanism 102 may use, but is not limited to, a cylinder to push the conductive connector 5, and a photoelectric induction conveyor belt continuously conveys the conductive connector 5 to the end of the piston rod of the cylinder, so that the conductive connector 5 is attached to the strip-shaped electrode plate material.

In this embodiment, the ultrasonic welding apparatus 103 may use, but is not limited to, an ultrasonic welding device to ultrasonically weld the conductive connector 5 to the strip-shaped electrode plate raw material.

The user places the roll-shaped electrode plate raw material on the discharge roller 9, continuously conveys the electrode plate raw material by the feeding mechanism 92, partially cuts the strip-shaped electrode plate by the forming mechanism 10 at intervals, folds the cutting portion by the folding mechanism 101, attaches the conductive connector 5 by the attachment conductive connector 5 mechanism at the folded portion, then welds the conductive connector 5 to the electrode plate by the ultrasonic welding apparatus 103, and rolls the processed strip-shaped electrode plate by the take-up roller 91.

In the present application, each device selected is a general standard component or a component known to those skilled in the art, and the structure and principle of each device are known to those skilled in the art through a technical manual or through a conventional experimental method.

In embodiments of this application, unless otherwise expressly specified and limited, terms like "mounted", "connected to each other", "connected" are to be construed in a broad sense, for example, as permanently connected, detachably connected or integratedly connected; mechanically connected or electrically connected; directly connected or indirectly connected via an intermediate medium; or internally connected between two elements. For those of ordinary skill in the art, specific meanings of the preceding terms in the present application may be construed according to specific circumstances.

With the inspiration of the preceding ideal embodiment according to the present application, through the preceding description content, the related staff may make various changes and modifications without departing from the scope of the technical idea of the present application. The technical scope of the present application is not limited to the content of the description, but must be determined according to the scope of the claims.

In the present application, through the structure of folding 180 degrees and welding the conductive connector, the folding angle is smaller than the folding angle in the existing art, there are fewer production processes, and the requirements for processing apparatuses are low. At the same time, in the process of processing, the folding angle is only 180 degrees, so that the folding angle of a processing apparatus is more easily controlled, the processing difficulty is reduced, and the production process reliability is improved. During processing, only the long strip-shaped current collector needs to be partially cut without being cut down. The long strip-shaped current collector may be rolled into a roll to cooperate with a subsequent continuous and automatic rolling process of the dry cell, so that the electrode plate and the dry cell can be continuously produced during the processing and manufacturing process, thereby improving production automation. Two ends of the conductive connector are welded to the first blank region and the second blank region respectively, so that a first conductor and a second conductor can be electrically connected and export or import a current, and the connection stability between the first conductor layer and the second conductor layer can be improved. The conductive connector has a relatively great thickness and is welded to a relatively thin conductor layer, so that the welding reliability can be improved. A special device automatically produces the current collector in a production line, so that the production efficiency is improved, and the labor cost is reduced.

What is claimed is:

1. A manufacturing method of an electrode plate, wherein the electrode plate comprises a current collector, a first blank region, a second blank region, a folded region, and a conductive connection, and the current collector comprises a first conductor layer and a second conductor layer, the method comprising:

disposing an active material on a partial region of the first conductor layer to form a first active material coating layer and the first blank region, wherein the first blank region and the first active material coating layer are disposed side by side and adjacent to each other; and disposing the active material on a partial region of the second conductor layer to form a second active material coating layer and the second blank region, wherein the second blank region and the second active material coating layer are disposed side by side and adjacent to each other;

folding part of the first blank region of the current collector so that a folded region of the current collector is formed in the first blank region; and connecting a first end of the conductive connector to the first blank region and connecting a second end of the conductive connector to the folded second blank region;

wherein disposing the active material on the first conductor layer to form the first active material coating layer, wherein the first blank region and the first active material coating layer are disposed side by side and adjacent to each other, and disposing the active material on the second conductor layer to form the second active material coating layer, wherein the second blank region and the second active material coating layer are disposed side by side and adjacent to each other comprise:

disposing the active material on first conductor layers on a plurality of current collectors at intervals to form a plurality of first active material coating layers, wherein one first blank region is formed between every two adjacent first active material coating layers of the plurality of first active material coating layers, disposing the active material on second conductor layers on the plurality of current collectors at intervals to form a plurality of second active material coating layers, wherein one second blank region is formed between every two adjacent second active material coating layers of the plurality of second active material coating layers, one of the plurality of current collectors, one first blank region, one of the plurality of first active material coating layers, one second blank region, one of the second active material coating layers form a semi-finished current collector, and a plurality of semi-finished current collectors are connected end to end to form a continuous semi-finished current collector;

folding the part of the first blank region of the current collector so that the current collector forms the folded region in the first blank region comprises: partially cutting a first blank region of each semi-finished current collector of the continuous semi-finished current collector and folding the each first blank region by a folding apparatus so that the each semi-finished current collector forms a folded region in the first blank region;

connecting the first end of the conductive connector to the first blank region and connecting the second end of the conductive connector to the folded second blank region comprise: placing a conductive connector of the each semi-finished current collector in the folded region, welding a first end of the conductive connector of the each semi-finished current collector to the first blank region, and welding a second end of the conductive connector of the each semi-finished current collector to a folded second blank region of the each semi-finished current collector, wherein one of the plurality of semi-finished current collectors and one of conductive connectors form one semi-finished electrode plate, and a plurality of semi-finished electrode plates are connected end to end to form a continuous semi-finished electrode plate; and the method further comprises: cutting the continuous semi-finished electrode plate into individual electrode plates.

2. The method according to claim 1, wherein the folding apparatus uses a mechanical arm to turn over the first blank region, and the folding apparatus is rotationally driven by a stepping motor.

3. An electrode plate, manufactured by the manufacturing method of the electrode plate according to claim 1, wherein the electrode plate comprises:

the current collector, wherein the current collector comprises an insulating layer, the first conductor layer disposed on a first side of the insulating layer, and the second conductor layer disposed on a second side of the insulating layer;

the first blank region and the first active material coating layer disposed on a side of the first conductor layer away from the insulating layer; and the second blank region and the second active material coating layer disposed on a side of the second conductor layer away from the insulating layer;

the folded region disposed in the first blank region, wherein when the current collector is folded, the second blank region partially covers the first blank region; and the conductive connector, wherein part of the conductive connector overlaps the folded region, a first end of the conductive connector extends out of the folded region to connect the first blank region, a second end of the conductive connector is located in the folded region to connect the second blank region, and the conductive connector is configured to be electrically connected to the first blank region and the second blank region.

4. The electrode plate according to claim 3, wherein the insulating layer is made of at least one of polyester, polyethylene, polypropylene, or polyarylsulfone.

5. The electrode plate according to claim 3, wherein the conductive connector is connected to the first blank region and the second blank region by ultrasonic welding respectively.

6. The electrode plate according to claim 3, wherein a folding angle of the current collector is 180 degrees.

7. The electrode plate according to claim 3, wherein the conductive connector is a tab.

8. A rechargeable battery, comprising:

a positive electrode plate, a separator, and a negative electrode plate which are bonded in sequence, and further comprising an electrolyte, wherein at least one of the positive electrode plate or the negative electrode plate uses the electrode plate according to claim 3.

9. The rechargeable battery according to claim 8, wherein the positive electrode plate comprises the current collector, the current collector comprises the insulating layer, the first conductor layer, and the second conductor layer, and in a case where the electrode plate is used as the positive electrode plate, each of a material of the first conductor layer and a material of the second conductor layer is aluminium or aluminium alloy.

10. The rechargeable battery according to claim 8, wherein the negative electrode plate comprises the current collector, the current collector comprises the insulating layer, the first conductor layer, and the second conductor layer, and in a case where the electrode plate is used as the negative electrode plate, each of a material of the first conductor layer and a material of the second conductor layer is copper or copper alloy.

11. The rechargeable battery according to claim 8, wherein the insulating layer is made of at least one of polyester, polyethylene, polypropylene, or polyarylsulfone.

12. The rechargeable battery according to claim 8, wherein the conductive connector is connected to the first blank region and the second blank region by ultrasonic welding respectively.

13. The rechargeable battery according to claim 8, wherein a folding angle of the current collector is 180 degrees.

14. The rechargeable battery according to claim 8, wherein the conductive connector is a tab.

* * * * *